(12) United States Patent
Bisti et al.

(10) Patent No.: US 11,044,075 B2
(45) Date of Patent: *Jun. 22, 2021

(54) GAME DATA OFFLOADING TO A BLOCKCHAIN

(71) Applicant: International Business Machines Corporation, Armonk, NY (US)

(72) Inventors: Jeffrey Bisti, Poughkeepsie, NY (US); Ryan Bertsche, Poughkeepsie, NY (US); Danielle Judka, Mount Laurel, NJ (US); Philip Siconolfi, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,416

(22) Filed: Jan. 20, 2020

(65) Prior Publication Data
US 2020/0153610 A1   May 14, 2020

Related U.S. Application Data

(63) Continuation of application No. 15/826,412, filed on Nov. 29, 2017, now Pat. No. 10,581,592, which is a continuation of application No. 15/655,014, filed on Jul. 20, 2017, now Pat. No. 10,348,487.

(51) Int. Cl.
| | | |
|---|---|---|
| *H04L 29/06* | (2006.01) | |
| *H04L 9/06* | (2006.01) | |
| *G06F 21/60* | (2013.01) | |
| *A63F 13/71* | (2014.01) | |
| *A63F 13/792* | (2014.01) | |
| *G06F 21/64* | (2013.01) | |
| *H04L 9/32* | (2006.01) | |

(52) U.S. Cl.
CPC ............ *H04L 9/0637* (2013.01); *A63F 13/71* (2014.09); *A63F 13/792* (2014.09); *G06F 21/602* (2013.01); *G06F 21/606* (2013.01); *G06F 21/645* (2013.01); *H04L 9/3236* (2013.01); *H04L 9/3297* (2013.01); *H04L 2209/38* (2013.01)

(58) Field of Classification Search
None
See application file for complete search history.

(56) References Cited

U.S. PATENT DOCUMENTS

| | | |
|---|---|---|
| 6,275,867 B1 | 8/2001 | Bendert et al. |
| 8,112,452 B2 | 2/2012 | Adya et al. |
| 9,529,923 B1 * | 12/2016 | Baird, III .............. G06F 16/182 |
| 9,767,649 B2 | 9/2017 | Dabrowski |

(Continued)

OTHER PUBLICATIONS

List of IBM Patents or Patent Applications Treated as Related, Feb. 19, 2020.

(Continued)

*Primary Examiner* — Andrew J Steinle

(57) ABSTRACT

An example operation may include one or more of initiating a session between one or more users, identifying an active game status associated with the one or more users during the session, creating a link to the active games status, storing the link in a blockchain, creating a message comprising the link to the active game status, and broadcasting the message to a plurality of potential users.

20 Claims, 8 Drawing Sheets

(56) References Cited

U.S. PATENT DOCUMENTS

| | | |
|---|---|---|
| 2007/0287517 A1 | 12/2007 | Asuna et al. |
| 2015/0363783 A1 | 12/2015 | Ronca et al. |
| 2016/0259937 A1 | 9/2016 | Ford et al. |
| 2017/0031874 A1 | 2/2017 | Boudville |
| 2017/0256003 A1 | 9/2017 | Isaacson et al. |
| 2017/0364908 A1* | 12/2017 | Smith .................. G06Q 20/023 |
| 2018/0005492 A1 | 1/2018 | Hall |
| 2018/0089641 A1* | 3/2018 | Chan ...................... G06Q 40/06 |
| 2018/0117447 A1 | 5/2018 | Tran et al. |
| 2019/0260576 A1 | 8/2019 | Bisti et al. |

OTHER PUBLICATIONS

Bisti et al., "Game Data Offloading to a Blockchain", U.S. Appl. No. 16/400,188, filed May 1, 2019.

Bisti et al., "Game Data Offloading to a Blockchain", U.S. Appl. No. 15/826,412, filed Nov. 29, 2017.

Bisti et al., "Game Data Offloading to a Blockchain", U.S. Appl. No. 15/655,014, filed Jul. 20, 2017.

\* cited by examiner

GAME DATA OFFLOADING TO A BLOCKCHAIN

TECHNICAL FIELD

This application generally relates to the management of network gaming on a blockchain, and more particularly, to game data offloading to a blockchain.

BACKGROUND

A blockchain is a type of computing architecture that enables a peer-to-peer distributed (shared and replicated) database or ledger, not controlled by a single organization or entity, but many different ones. Spanning across a network of independent machines, the configuration permits the nodes to reliably track and maintain the state of information in a system. In doing so, blockchain enables the cost-efficient creation of business networks without requiring a central point of control. This configuration operates in contrast to traditional database-oriented systems, where independent parties maintain their own systems of record and reconcile updates with one another in inefficient and sometimes complex inter-organizational processes, which requires the services of an independent, trusted third-party administrator.

The complexity of a modern online multiplayer environment places an enormous demand on the underlying technology and infrastructure used to support the gaming functions. While a shift to a predictive physics model has helped some of the physics-based calculations to the client side, the current state of the gaming environment still requires a game server to act as an authoritative unit to create, manage, and validate in-game events and actions. Many of these events are inconsequential after a relatively short amount of time, for example, tire tracks left behind another player's vehicle in a car driving game type environment, however, such trivial game changes still require a great deal of computing resources and low-latency infrastructure to maintain those small details in synchronization between players to achieve an immersive environment. When a game server becomes overloaded, the players' expectations are not always met, and the perception of quality suffers immediately.

The timeline for online gaming is parallel to the timeline for distributed computing. When dumb terminals were connected to mainframes and minicomputers, multiplayer games sent the gamer's controller inputs and waited for the response, which would then be rendered on the screen by the game engine. All in-game processing was handled server-side. When client/server became popular, and some operations were performed on the user's computer hardware, game consoles and the computers began handling more of the collision detection and graphical rendering for massive multiplayer online role-playing (MMORPG) and first-person shooter (FPS) games. Today, a system of record and engagement modeling in computing is used where the responsibility for driving the user experience is offloaded to the end device. Online gaming has taken a similar approach with the predictive physics approach, where the client's hardware and software predicts how the server will respond, and presents that to the user immediately while it waits for the server confirmation. This provides that a button-press is reflected in gameplay without delay, delivering a single-player reaction time with multi-player interactions. This is the current state-of-the-art, but gamers are a demanding increased optimization for online games, and any new game that does not use predictive physics would likely be criticized for having clunky unresponsive controls.

SUMMARY

One example method of operation may include one or more of initiating a session between one or more users, identifying a current status of user activities associated with the one or more users during the session, determining whether the current status of the user activities requires updates to a local blockchain or a session blockchain, and storing the current status of the user activities in one or more of a local blockchain and a session blockchain.

Another example embodiment may include an apparatus that includes a processor configured to perform one or more of initiate a session between one or more users, identify a current status of user activities associated with the one or more users during the session determine whether the current status of the user activities requires updates to a local blockchain or a session blockchain, and store the current status of the user activities in one or more of a local blockchain and a session blockchain.

Another example embodiment may include a non-transitory computer readable storage medium configured to store instructions that when executed causes a processor to perform one or more of initiating a session between one or more users, identifying a current status of user activities associated with the one or more users during the session, determining whether the current status of the user activities requires updates to a local blockchain or a session blockchain, and storing the current status of the user activities in one or more of a local blockchain and a session blockchain.

DETAILED DESCRIPTION

Figure 1A:
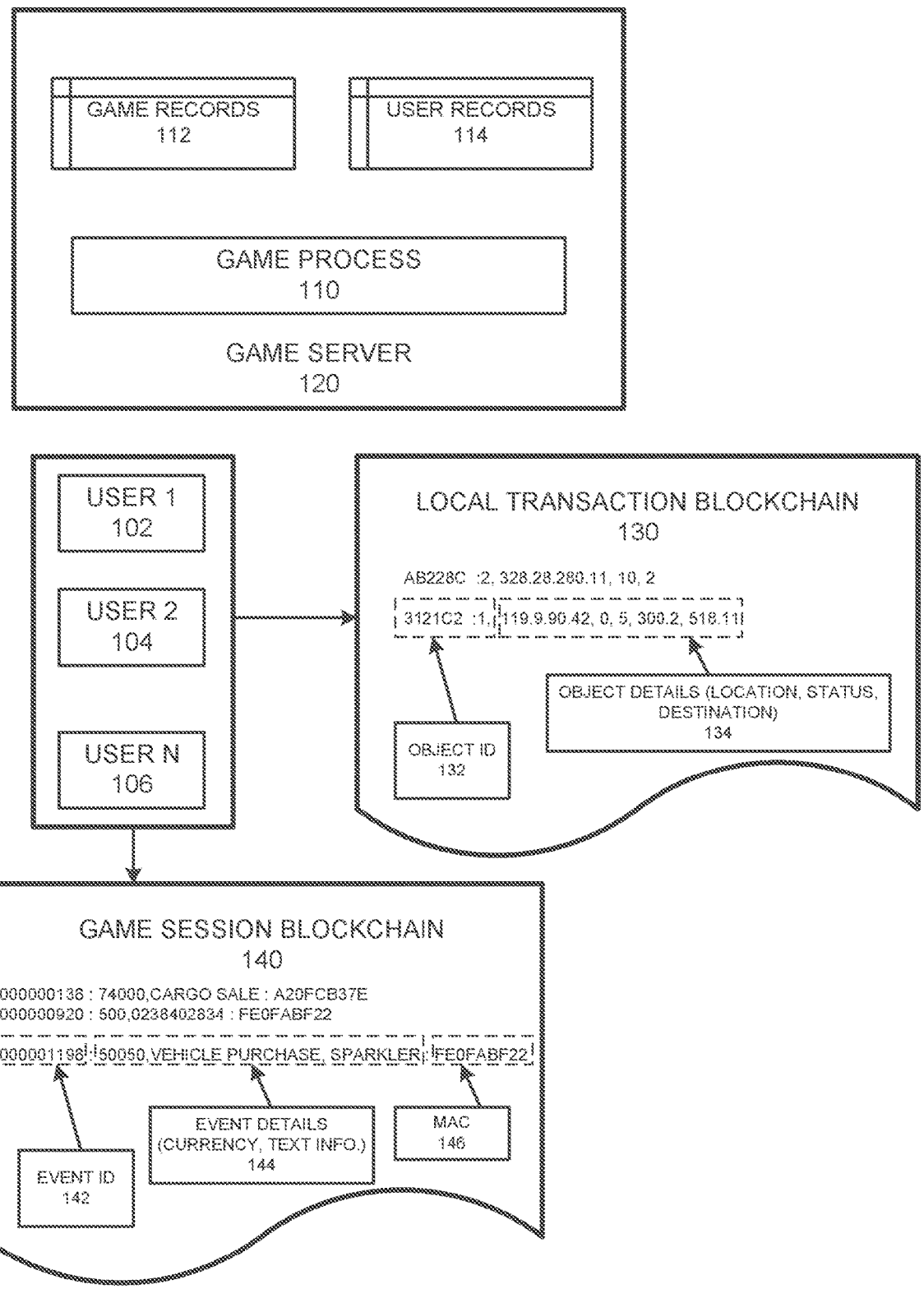
FIG. 1A illustrates a logic diagram of a game process being managed via the blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to the management of network gaming on a blockchain, and in another embodiment relates to managing offloading of gaming data onto one or more blockchains to optimize user gaming experiences.

Example embodiments provide offloading some of the in-game processing of an online game to a shared ledger (i.e., blockchain). Examples may include offloading inconsequential data to collective ledgers on the client side, such as a local blockchain or other less used data management entity. By storing such activity data, the transactional data can be linked to any purchases and/or real or cryptocurrency transactions. Also, the online activity data may be offloaded from a centralized activity server to the customized temporary ledgers. The activity may be any collaboration between users including group projects, group papers, group conferences, multi-user games, etc. In the gaming example, viewing the gameplay transactional data to analyze the risk and cost associated with specific transactions may be performed to evaluate data analytics. If a transaction is classified as a high-risk scenario, meaning the end user has invested some type of real currency, then the gameplay data will be analyzed to make sure that that the game events and related transactions are correct and match what was recorded on the blockchain.

Limits and ratios may be set to determine where resources will be spent to validate the game data. The players of the multi-user game may be responsible for performing a majority of the object and transaction checking, while the servers will check by generating message to the players periodically to confirm that everything appears valid. This approach may reduce server data load and permit for the work to be synchronized across all the players. In the current multi-user, online, network or related gaming environment most online game engines do not keep track of every object and every transaction since the servers would not be able to support this much data interaction. By introducing blockchains, the inconsequential data will be offloaded to collective ledgers on the client side. This will safeguard transactional data, which may be tied back to real currency, while offloading the game session data from the gaming servers to temporary ledgers. This model will view the gameplay transactional data to analyze the risks and costs associated with specific transactions. If the transaction is classified as a high-risk scenario, such as when the end user has invested some type of real currency, then the gameplay data will be analyzed to ensure that everything is correct and matches what was recorded on the blockchain.

According to example embodiments, fully-interactive gaming environments may include, for example, fluid interactions with simulated characters, such as roads that turn slick and reflective when it rains, and the ability to influence in-game events is expected to occur simultaneously for everyone logged into the same game session. In order to maintain the level of detail and the type of experience that is expected by the player while optimizing performance and the immersion of the simulation, there needs to be a change in the way developers approach the way gamers interact with the game model.

One approach is the offloading of some of the in-game processing to a shared ledger (i.e., blockchain). There are certain functions that a game console or user computer can perform well, however, in an online gaming environment, all of those actions should be synchronized across all players at some point, and a blockchain configuration provides a medium as a collective ledger, based on a set of pre-defined rules, which can optimize an online multiplayer game. The actions in a typical online game can be identified as one or two main categories including interactions between users and a game model and actions of one user which need to be made visible to other users. For example, when a player '1' moves their character down a path, then player '2' should not only be able to view this animation of player '1' moving on their screen, but must also be able to interact with that player. For this reason, information, such as the map/screen position and action (i.e., walking, running, driving, etc.) of a player and actions (i.e., moving, using a tool, engaging other players) they are performing needs to be rapidly relayed to other players. However, one player sitting in a car in the middle of a field honking their car horn is not relevant to the other players since it does not effect their game status on the other side of the map.

According to example embodiments, to reduce the number of messages that need to be broadcast and received, each player only receives information that is relevant to them. This is typically performed based on an in-game location and what is visible/audible to other players. Such information is enough information to create a basic multiplayer user environment. Procedurally-generated actions based on initial seed values. Since most online games are more involved than two players on a featureless flat plane, then to create the illusion of a single "world" being experienced simultaneously by multiple players, most game engines rely on the 'gamestate'. The gamestate is a true moment-in-time representation of everything that affects another player's game experience in that world/environment. In a modern online multiplayer game, it would be burdensome to track every single object and non-playable characters (NPC), and most online game engines do not provide such services. Rather, they start with a series of seeded values. Those values will affect the output of pseudo-random-number generators, which will in turn create the illusion of a unique universe each time. For example, when a multiplayer game session begins, it will need to determine where to create (spawn) all of the background characters, or non-playable characters (NPCs). The session will use another value to determine the clothes that player should be wearing, another to determine the body type, and another to determine their action. If that action is "walking", another value will be used to determine where the player's avatar is going.

In a single player experience, certain values may be randomly generated to arrive at a 100% unique game experience every time the game is initiated. To ensure that multiple users can experience the same seemingly-random universe/area/environment, each player begins their session with the same set of "seed" values. Like a stacked deck of cards, the randomness is only so random. Even when a player seemingly disrupts the environment, by parking a vehicle in the middle of a crowded intersection, NPCs will still react the same in player '1's' universe as they do in player '2's'.

According to one example, in-game transactions and data changes, such as accumulating coins, money, points and certain items, such as modifications, weapons, bonus elements, etc. This information may be recorded and reflected in the game model, as it could affect all future gameplay. This includes gains and losses of in-game money, ownership of objects, completion of tasks, and in-game character appearance. This can be thought of as being analogous to the many ways one can talk about a baseball game. The time of day, location, starting lineup, and players available are the seed values that are used to build the game environment. The hits, runs, errors, and strikes are in-game events that are high-level and will be recorded to update the player statistics going forward. Details about how close a play was at home base, and the speed of a fastball might be interesting at the moment, but ultimately do not play into who wins the Championship.

A blockchain-based model permits the offloading of a significant portion of a game's processing to the collective client side. This is something that is not possible before blockchain became a viable technology. There are two main classifications of messages handled in a typical multiplayer online gaming environment. Type '1' data is broadcast through a simple messaging platform, which could be a messaging platform, which is useful for keeping track of the movements of other players with low latency. Simple filtering and models may limit the use of bandwidth and system resources. Type '2' data, the information which records deviations from the initial gamestate, needs to be made available so that players can work off the same set of records. For example, simply knowing that player #1 is standing in one location, and player #2 walking into that area also needs to know that they broke all the wooden crates in the area, so both players are observing the same environment, and that player #2 is not going to break the same crates.

To facilitate the game environment in a serverless model, multiple blockchains may be used with rapid block read, write and update times so that a player entering an area being affected by another player can be quickly brought up to date with all changes that might affect their experience. As this data is used solely to synchronize user experiences in the same area, the blockchains are not participated in by the game server unless cheating is suspected, in which case, actions leading up to and including the cheating can be viewed by "playing back" the actions.

For persisted data, a second type of blockchain may be used, which persists for the length of the private gaming session. Tracking those changes should be treated just as one would track real-world monetary transactions, as in-game items and currency are often purchased items, and it is required that they are not be forged by players seeking to exploit the game's economy. Blockchains are not a suitable solution when high-speed, low-latency communication is required. In the case of a player-vs-player (PvP) or Co-Operative (co-op) situation, the outcome of an encounter between different players is often decided on who was faster by hundredths of a second. To facilitate those situations, a more traditional messaging system can be used, which can be a messaging platform or any other platform for low-latency messaging between peers. This data needs to be dispersed as quickly as possible, and does not need to be persisted once read. An example of this distinction may include two players driving in two different vehicles down a street while other players watch. For the players not directly involved, it is adequate for them to receive updated information on the vehicle's movement and position every 500 ms. This is sufficient data to keep the environment consistent between participants without requiring a massive amount of network resources. If those two players were racing head-to-head, however, that level of detail resolution would probably not be sufficient, which is where a high-speed messaging platform would become a requirement.

To validate the transactions, every event in the game is assigned a unique ID so that it can be easily identified by other players, or during a verification effort afterwards. The identifier, along with the values and identifier of the event, will be used as a *salt*, along with cryptographic keys to create a message authentication code. With this information, any other player can validate that any event seeking to be recorded by any player was generated based on the original seeded values. This can be verified by other players in the session, as they have to be logged out via the type '1' broadcast system, and because the values cannot be tampered with without producing an invalid MAC. With this framework, it is possible to increase complexity and richness of the simulated environment, while keeping the server-side processing largely decoupled from moment-to-moment gameplay.

With appends made to local and game session blockchain, the information is immediately visible to all players who may be affected and need to update their environment model through gameplay or user to user chat sessions, which occurs over the high-speed messaging platform. A new block can be confirmed based on a timer, a message threshold, or another parameter based on the specific implementation.

FIG. 1A illustrates a logic diagram of a game process being managed via the blockchain, according to example embodiments. Referring to FIG. 1A, the example configuration 100 includes a game server 120 responsible for hosting one or more games managed by a game process 110, which stores and utilizes game records 112 and user records 114. The users 102, 104 . . . 106 may be part of an ongoing game session managed by the game server 120. The two blockchains are used to store information about events which took placed during the game operation.

In order to offload data managed by the game server 120, the different types of in-game messaging and transactions may be offloaded to channels better suited for online multiplayer environments. Once example of a scenario using all three channels including direct (chat), local blockchain, and session blockchain would be for a racing simulation. Blockchain, is not the ideal selection for situations that require low latency. For instance, person-to-person or server/client communication is needed to keep players synchronized of where other car racers are around them on the race track. During the race, a racer may knock into a lamppost or leave skidmarks on a turn. That information needs to persist for racers coming into that area behind them, so it is kept in the local blockchain 130, possibly until it is deemed no longer relevant, or hasn't been accessed in X seconds/minutes. Lastly, any sort of lap records or top speeds or high scores or achievement unlocks that happen would take place on the session blockchain 140, mostly so that they can be validated by the game server and/or other gaming participants.

The chat or messaging platform is used when low latency is required, and is used not just for chat, but the immediate coordinates of other players, vehicles, projectiles, low bandwidth data sharing, etc. In other examples, more and more in-game items and in-game currency can be tied to real-world currency. For example, an increasingly common game model is to sell a game, and then sell in-game currency afterwards. Players have the option of earning that money by completing missions, which can be time consuming, and which may be referred to as 'grinding', or, alternatively, they can buy in-game currency. If in-game currency is cheated or hacked, then players won't spend real-world money on in-game currency, and development can't continue. A single hack that permits users to sell the same car multiple times, results in a real-world loss of revenue by the publisher due to loss of player trust and interest. In FIG. 1A, the local transaction blockchain 130 is storing a less important game event, which is stored by an object ID 132, and object details, such as its location and status 134. The changes are identified as they occur and logged in the blockchains depending on their event type. In the example of the game session blockchain 140, the transaction is a purchase with an event ID 142 and event details 144 and a MAC address 146 to verify the purchase or sale of an in-game item.

In another game example, events may include driving and hitting a lamppost, breaking a crate, moving an elevator between floors, turning a light switch on/off, destroying the wall of a building, creating tire/skid marks. Any of those examples may be identified and categorized by an event type so the correct blockchain can be used to log the event(s), in this case, the local transaction blockchain 130. In another example, events which may be identified and stored in the session blockchain may include trading items with other users, leaderboard-based awards, such as setting a new record in a race or other competition, finding/unlocking new items, obtaining in-game items that everyone else can obtain, anything that has consequences outside of the current game session, character augmentation/enhancements, such as spending in-game currency to enhance a character. Buying a new item in-game should be a session transaction because if it is not, then it may be possible for someone to sell the same vehicle repeatedly, collecting in-game currency faster than the publishers intended. Putting it on the session blockchain 140 allows for checking those actions against the seeded values.

In most open-world games, a lot of the world seems completely arbitrary. For example, driving through a busy part of town will show hundreds of pedestrians and drivers in vehicles moving through the area. This is easy enough to setup in a single-player game, but becomes more challenging when trying to synchronize that experience for multiple players. Two players in the same session need to be able to say "Let's meet over there by the blue car in front of the store" and see the same thing otherwise the multi-player experience falls apart. The way this is possible in games is by starting the game session with a set of seeded values. This can be a single long value, or a series of values, but the approach is to start with a certain amount of entropy. With all players sharing these values, any "random" number that is generated using the same algorithm and the same seed values will yield the same results between players. This is how car colors, traffic light timings, pedestrian patterns, and in-game weather can produce a seemingly infinite number of combinations, but stay synchronized across sessions. This is similar to having four decks of cards that have been shuffled in exactly the same way.

Figure 1B:
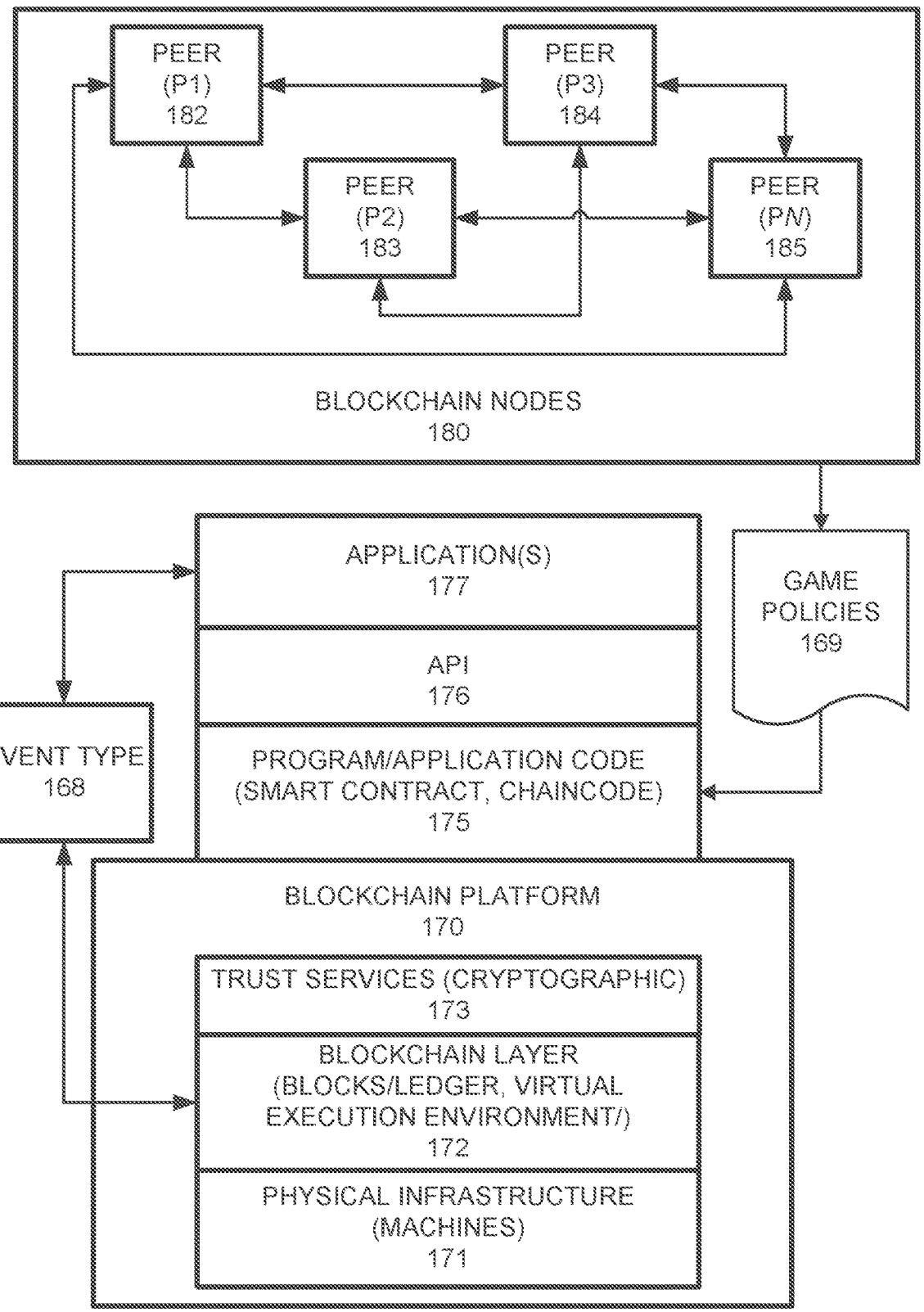
FIG. 1B illustrates a blockchain system configuration according to example embodiments.

FIG. 1B illustrates a blockchain system configuration according to example embodiments. The blockchain system 150 may include certain common blockchain elements, such as a group 180 of assigned peers 182-185 which participate in the blockchain transaction addition and validation process (consensus). Any of the blockchain peer nodes 180 may initiate new transactions and seek to write to the blockchain immutable ledger 172, a copy of which is stored on the underpinning physical infrastructure 171. In this configuration, the customized blockchain configuration may include one or applications 177 which are linked to APIs 176 to access and execute stored program/application code (e.g., chain code and/or smart contracts) 175, which are created according to the customized configuration sought by the participants and can maintain their own state, control its own assets, and receive external information. This code can be deployed as a transaction and installed, via appending to the distributed ledger, on all blockchain peer nodes.

The blockchain base 170 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 172 exposes an interface that provides access to the virtual execution environment necessary to process the program code and engage the physical platform 171. Cryptographic trust services 173 are used to verify transactions and keep information private. As a result, smart contract changes which are proposed and/or approved (i.e., via consensus among peers) can be created and updated on the blockchain to accurately update consumer debt information.

The blockchain configuration of FIG. 1B may process and execute program/application code 175 by way of the interfaces exposed, and the services provided, by blockchain platform 170. The code may control blockchain assets, for example, it can store and transfer data, and may be executed by the blockchain in the form of a smart contract, which includes chain code with conditions or other code elements subject to its execution. The smart contracts 175 may be created to execute reminders, updates, and/or other notifications subject to the changes, updates, etc. The smart contracts can themselves be used to identify network usage and data IO statuses and compare the actual network resource levels to contractual thresholds and other variables which may be exceeded or enacted to launch changes or notifications. For example, the thresholds of data IO, if exceeding smart contract levels, may be identified and used as the basis for a tier change, notification and/or suggested course of action, both manual and/or automated. The tiering may occur automatically if the smart contract permits the change upon detection of the exceeded threshold. The game policies 169, once decided by the peers via consensus, can be updated into the smart contracts 175 accordingly.

In this example embodiment, the smart contract may store requirements of one or more users/consumers to the network. The requirements may be any type of network resources, such as memory, CPU utilization, throughput, bandwidth, priority, etc. The requirements may be itemized in a network resource usage policy table or file. The policies related to the requirements may define the requirements and the provider requirements necessary to fulfill the consumer needs. The smart contract may store such information and may be referenced by providers seeking to conduct transactions with those consumers, especially when the provider has the resources to provide. The results of a consumption session may be stored in the blockchain as an updated log to the smart contract execution. Event types 168 may be identified as belonging to one or more sub-chains of the blockchain 172. For example, game events 168 which are global or important to all players may be stored in the session wide blockchain while other game events which are less important may be stored in the local blockchain.

Figure 2A:
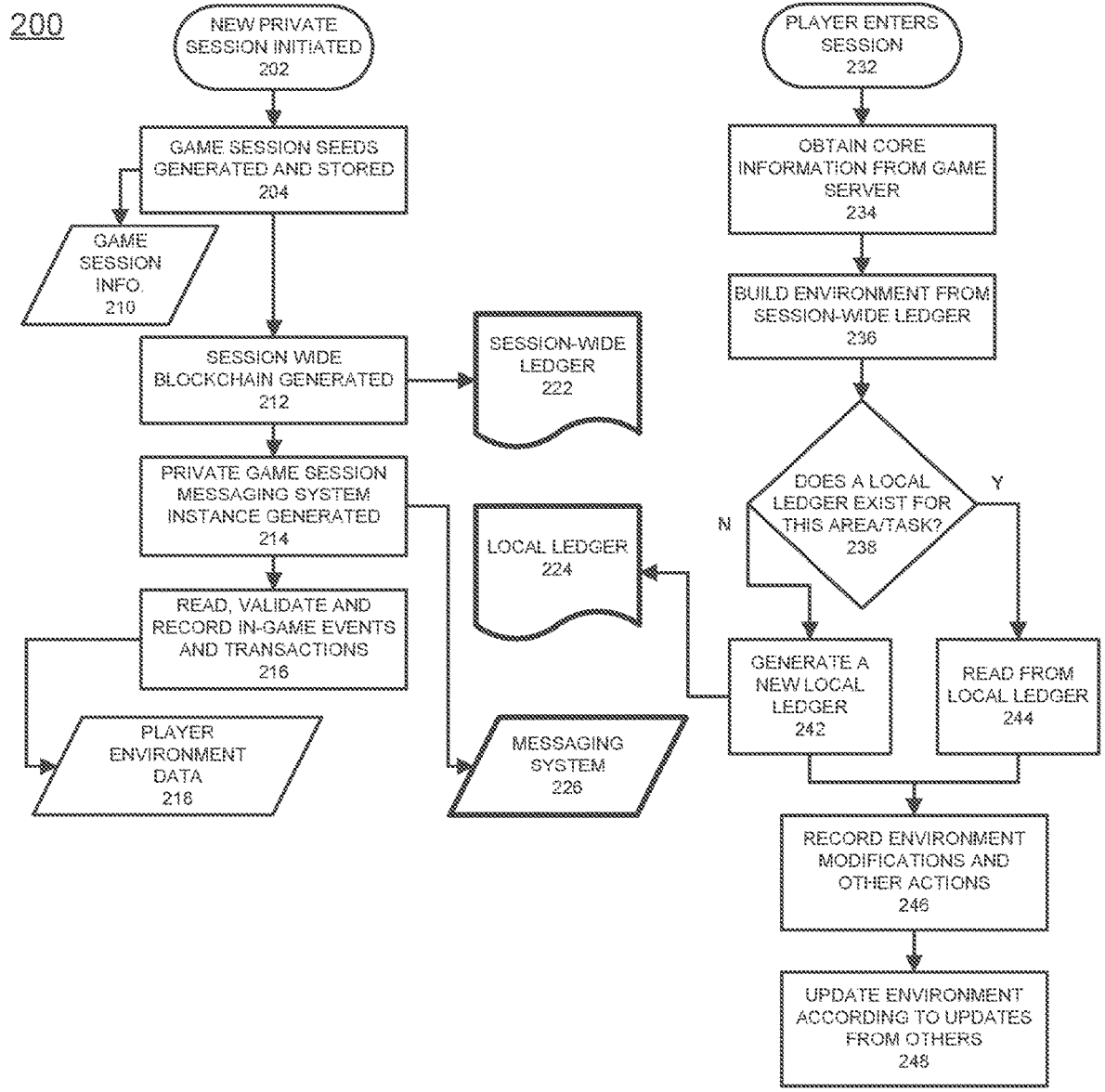
FIG. 2A illustrates a logic diagram of information flow and processes for data offloading management via the blockchain, according to example embodiments.

FIG. 2A illustrates a logic diagram of information flow and processes for data offloading management via the blockchain, according to example embodiments. Referring to FIG. 2A, this example is a workflow diagram 200 for creation and usage of the blockchains. The left server-side of the diagram includes a new session being initiated 202 and session seeds being generated and stored 204 in the session wide ledger 222. This includes game session data 210 and provides for generating 212 the new blockchain ledger 222 for the new game session. A private game session messaging system 226 instance may be generated 214 to permit data messaging as an alternative to using the blockchains. The in-game events are identified and recorded 216 in a player environment data repository 218.

The client-side example provides a player entering a session 232 and obtaining core information the game server 234. The environment is built from the session wide ledger 236. The code accessing the session-wide ledger determines if there is a local ledger created yet 238. For example, if a player in a new session enters an area of the map where nobody else has been yet, it can be assumed that there is no local ledger created for that area, for example purposes, that new area will be referred to as '1,1'. The session blockchain is checked for this, and spawns a local ledger, noting its creation and connection information into the session blockchain. Now, when player #2 enters area '1,1', they know where to access the current local blockchain 224. This is a crossover between the two types of blockchains. Any style of blockchain may be used since one can assume that the local blockchains will have faster refresh windows, and perhaps a higher tolerance for disagreement between participants, whereas the session blockchains afford for more stringent checking, since in-game currency is being used. The local ledger is created 242 if it does not exist, otherwise it is read from 244 when recording environment modifications and other actions 246. That environment is updated according to updates from others 248.

In a specific game example according to example embodiments, four players may accept a quest to find a dragon. The mission includes having the player avatars (characters) walk through a dungeon full of traps and at the end is a dragon guarding a one of a kind treasure chest. The players have weapons and magic spells that can attack enemies while traversing through the dungeon. On their way, they occasionally fight monsters who drop loot that the players collect. The actions of walking around, using an attack, and using any chat functions will be placed into the "real time communications channel". These are actions based on the immediate actions of the player and directly around the player. This type of information is not important to the game session and only for the immediate reference for the players. While walking around the game landscape, the players run into holes and traps that they must escape from. Those occurrences are on the local blockchain since it is only pertinent to the current session. Players participating in this current session need to know about these occurrences but only within this occurrence. Outside of this environment, a different player does not need to know about the traps or holes. For example, if player 1 runs ahead of the others and breaks apart a treasure crate, that information will need to be persisted when players 2, 3 and 4 catch up with them, so that information will be placed on the local blockchain.

The players finally enter the dragon's den in which the dragon has 1000 health points. Each successful attack on the dragon lowers that value. After attacking and casting spells, the dragon's health points diminish to 0 and the dragon disappears. They then approach the rare treasure chest and obtain the treasure. The dragon and the treasure chest can never be re-obtained by the players, nor can they re-obtain the items that they collected from the dragon and chest. Due to the important information about defeating the dragon and obtain these items, this would be recorded on the session blockchain so that the information can be validated every time the player enters a game session.

Figure 2B:
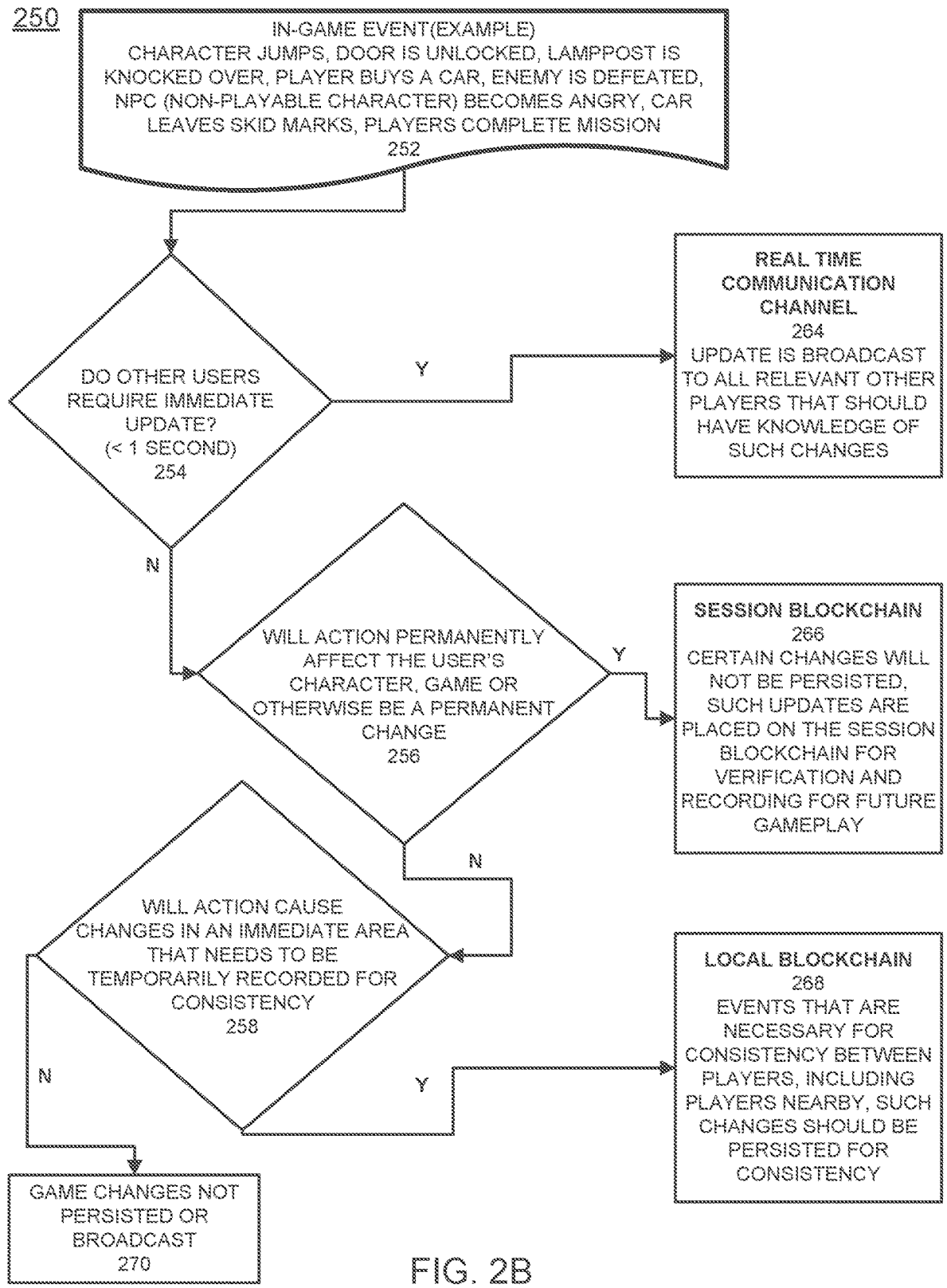
FIG. 2B illustrates a logic diagram of examples used to determine which blockchain to use to store game data and whether to broadcast or ignore the game data, according to example embodiments.

FIG. 2B illustrates a logic diagram of examples used to determine which blockchain to use to store game data and whether to broadcast or ignore the game data, according to example embodiments. Referring to FIG. 2B, the example 250 includes one or more in-game events being identified during a gaming session 252. For example, a player may jump, unlock a door, knock over a lamppost, buy a car, defeat an enemy, cause a non-playable character to become angry, make skid marks, and complete a mission. Among those player events, a determination can then be made as to whether the other players require an immediate update 254, if so, a real time communication channel 264 may be used to update those players via broadcast. The relevant players are identified and updated via the broadcast option. If the immediate update is not required, a determination is made to determine whether the action will permanently affect the user's character, game or otherwise by a permanent change that should be persisted 256. If so, the choice is to log the event in the session blockchain 266. The changes may include changing levels in a game, spending money, changing appearance, completing a mission, etc. The changes should be verified and recorded for future gameplay. If the changes are not permanent but temporary and should still be recorded 258, the local blockchain 268 should be used to store the events that will be necessary for consistency among players, such as knocking over a mailbox, tire tracks, or something that alters a pre-seeded flow. All players nearby will need to observe those changes for consistency. Those changes are not long term. If however, the changes are not important and do not impact others, the game changes may not be persisted 270 in any blockchain and will otherwise be ignored or disregarded.

Figure 3:
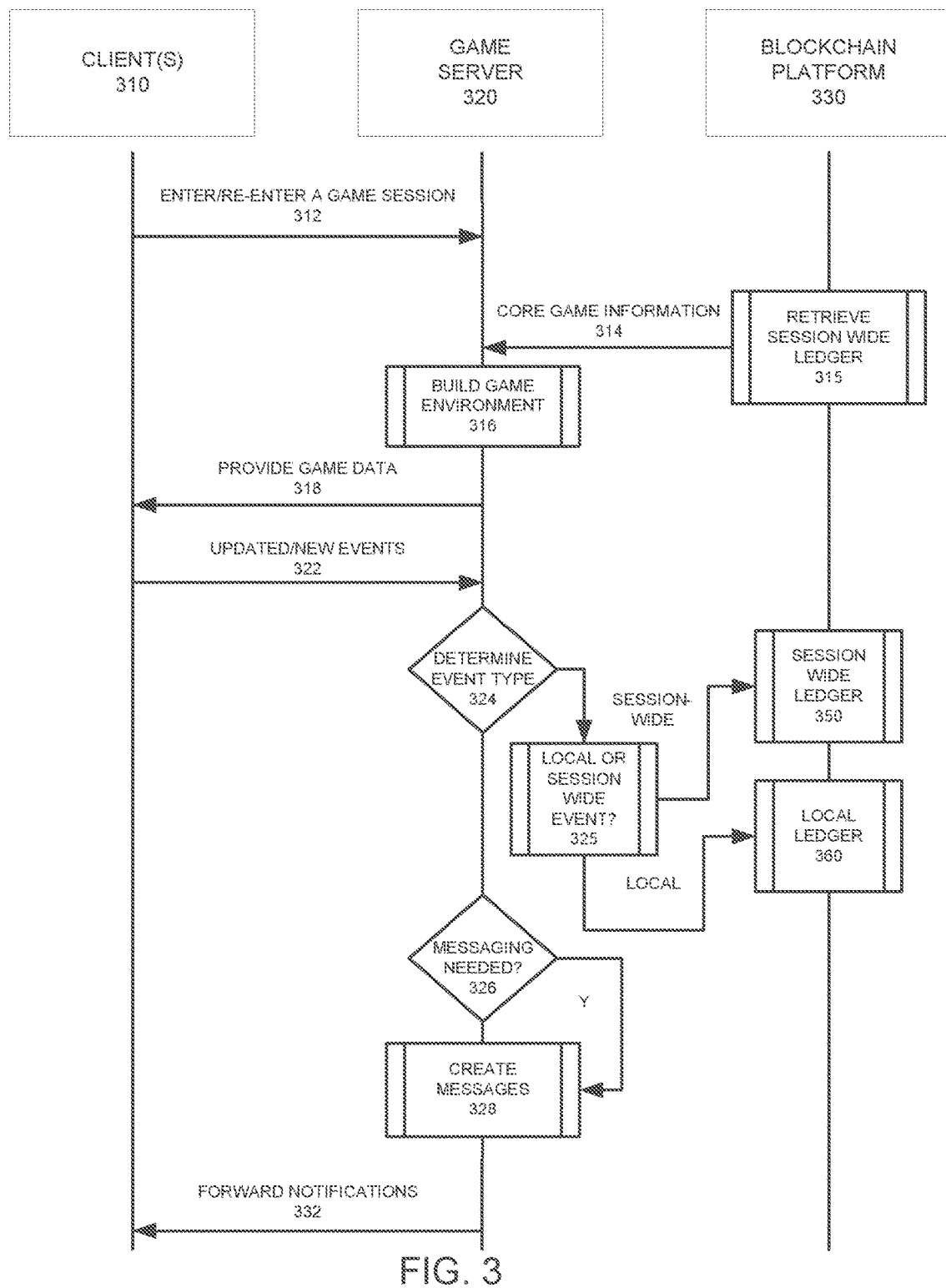
FIG. 3 illustrates a system messaging diagram of the interactions between game clients, a game server and the blockchain, according to example embodiments.

FIG. 3 illustrates a system messaging diagram 300 of the interactions between game clients, a game server and the blockchain, according to example embodiments. Referring to FIG. 3, the system 300 may include a number of components or modules which may include software, hardware or the combination of both. The components may include a first component, such as one or more game players or clients 310 which may enter a game session 312 and access a second component, such as game server 320. The core game information may be updated 314 based on data of a session wide ledger 315 stored on a third component, such as a blockchain 330. The environment may be built 316 and rendered for the user device. The game data is shared with the user device 318 and new events are identified and sent to the server 322 based on user actions. The event type 324 may be determined to be a local or session wide event 325. The session wide ledger 350 may be updated accordingly or the local ledger 360 depending on the type of event which occurred. Also, as an alternative, the messaging needed 326 may be determined instead to create a messaging scenario to create messages 328. The notifications may be forwarded 332 to the clients as needed depending on the events.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 310, 320 and 330 may be directly connected or communicably coupled to one another, in a wired or wireless manner, and may reside locally and/or remotely.

Figure 4A:
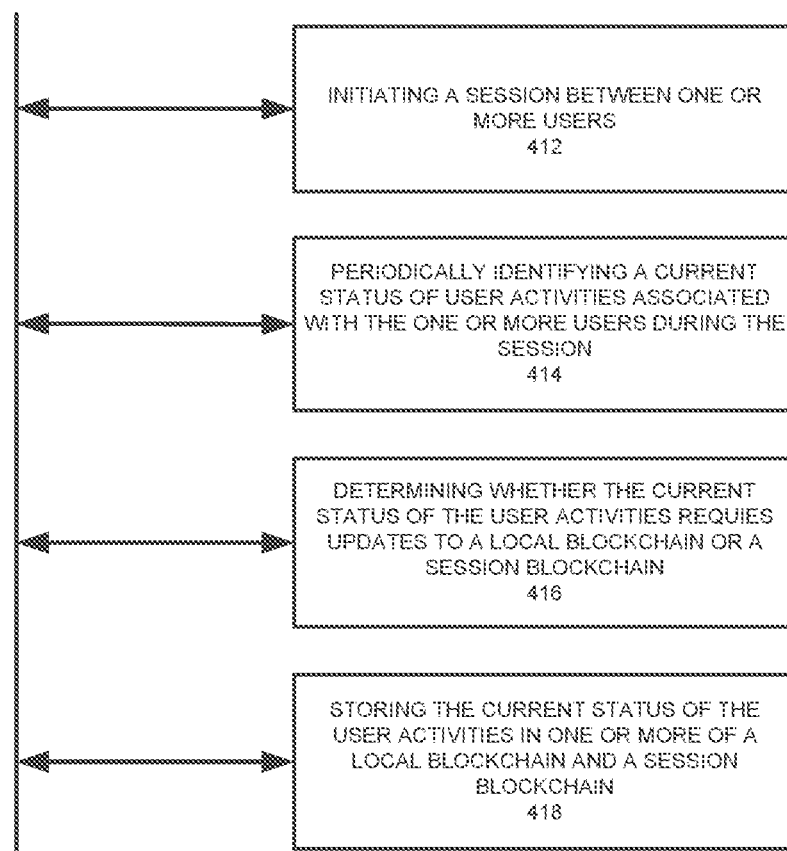
FIG. 4A illustrates a flow diagram of an example method of managing game data offloading in the blockchain, according to example embodiments.

FIG. 4A illustrates a flow diagram of an example method of managing game data offloading in the blockchain, according to example embodiments. Referring to FIG. 4A, the method 400 may include initiating a session between one or more users 412, identifying a current status of user activities associated with the one or more users during the session 414, determining whether the current status of the user activities requires updates to a local blockchain or a session blockchain 416, and storing the current status of the user activities in one or more of a local blockchain and a session blockchain 418. The session includes one or more of a chat session, an application sharing session and a multi-player gaming session.

The method may also include determining whether the local blockchain exists for the current status of the user activities, if not, creating the local blockchain, and storing the current status of the user activities and an environment associated with the current user status in the local blockchain. The method may also include determining whether the local blockchain exists for the current status of the user activities, if so, retrieving transaction data from the local blockchain and modifying an environment associated with the current user status, and storing the current status of the user activities and the modified environment in the local blockchain. The method may further include determining the current status of the user activities requires updates to the session blockchain based on an event type associated with the current user activities, and storing the current status of the user activities in the session blockchain. Also, the method may include identifying the current status of the user activities includes an instance of private messaging. The method may further include creating a private messaging session, and storing the current status of the user activities in the private message session.

Figure 4B:
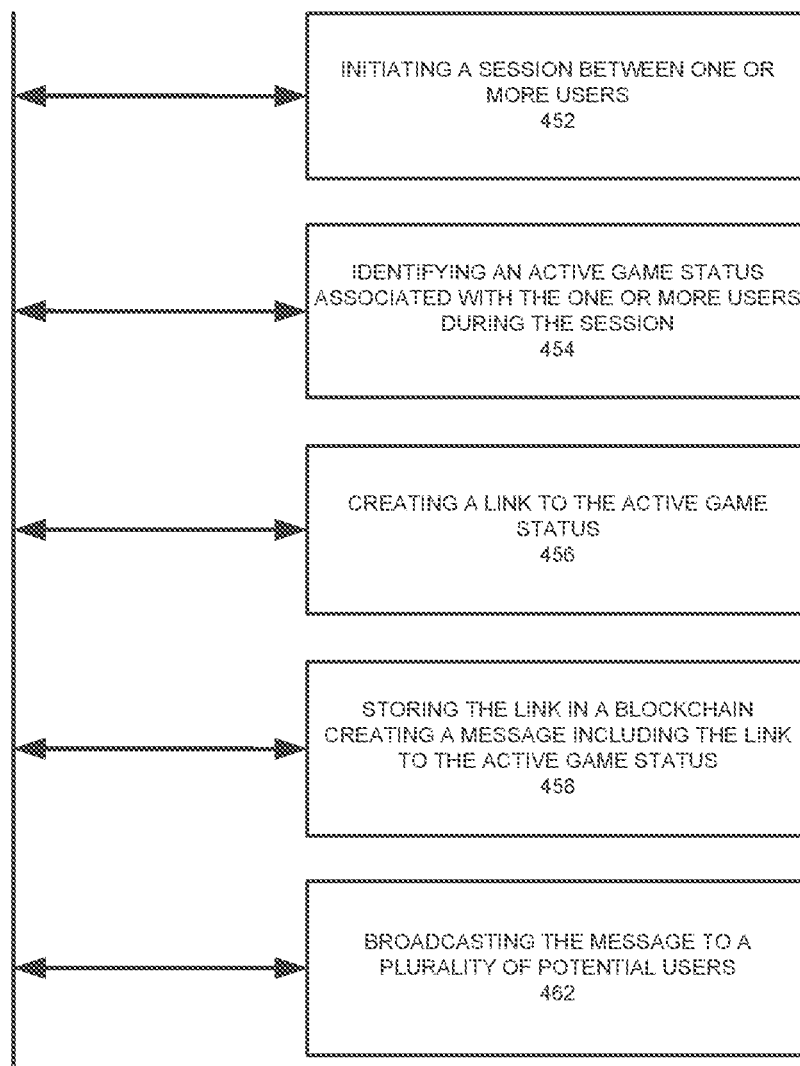
FIG. 4B illustrates a flow diagram of an example method of managing game data access in the blockchain, according to example embodiments.

FIG. 4B illustrates a flow diagram of an example method of managing game data access in the blockchain, according to example embodiments. Referring to FIG. 4B, the method 450 may include initiating a session between one or more users 452, identifying an active game status associated with the one or more users during the session 454, creating a link to the active games status 456, storing the link a blockchain 458, and creating a message comprising the link to the active game status, and broadcasting the message to a plurality of potential users 462. In this example, the active games session is identified by a link which can be easily shared with others so access to the game can be readily obtained by other parties. The link is stored in a public ledger for access and a message may be made and shared to notify the others of the game session and to create private invites to those who are available to join the session.

Example embodiments may be a system, a method, and/or a computer program product at any possible technical detail level of integration. The computer program product may include a non-transitory computer readable storage medium (or media) having computer readable program instructions thereon for causing a processor to carry out aspects of the embodiments.

The non-transitory computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent or be integrated in any of the above-described components, etc.

Figure 5:
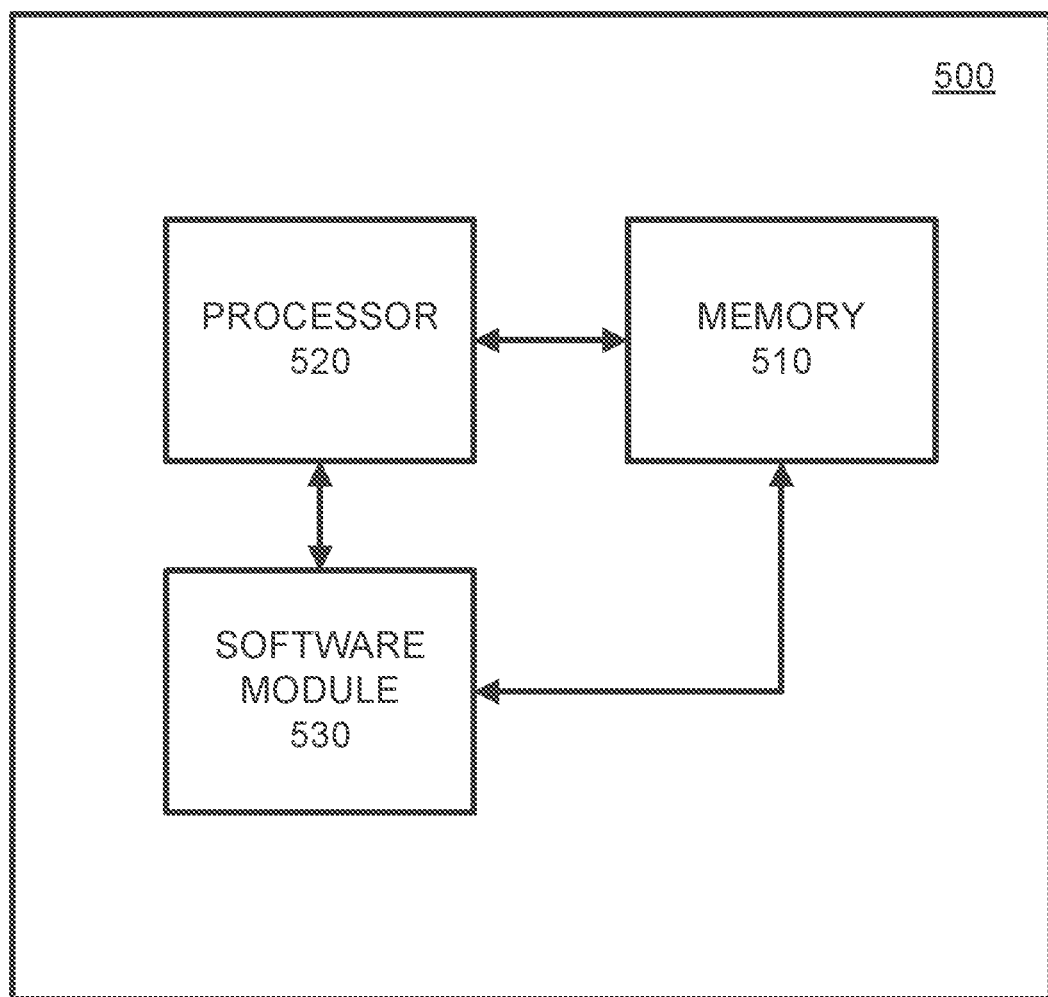
FIG. 5 illustrates an example network entity configured to support one or more of the example embodiments.

As illustrated in FIG. 5, a memory 510 and a processor 520 may be discrete components of a network entity 500 that are used to execute an application or set of operations as described herein. The application may be coded in software in a computer language understood by the processor 520, and stored in a computer readable medium, such as, a memory 510. The computer readable medium may be a non-transitory computer readable medium that includes tangible hardware components, such as memory, that can store software. Furthermore, a software module 530 may be another discrete entity that is part of the network entity 500, and which contains software instructions that may be executed by the processor 520 to effectuate one or more of the functions described herein. In addition to the above noted components of the network entity 500, the network entity 500 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
communicating, during an online game session, an update of a current status of a first user activity associated with at least one of a first user and a second user in the online game session to a local blockchain;
communicating, during an online game session, an update of a current status of a second user activity associated with at least one of the first user and the second user in the online game session to a session blockchain; and
validating the update to the session blockchain in response to the first user or the second user entering a new game session.

2. The method of claim 1, wherein the game session comprises one or more of:
a chat session and an application sharing session.

3. The method of claim 1, further comprising:
determining whether the local blockchain exists for the current status of the user activity;
if not, creating the local blockchain; and
storing the current status of the user activity and an environment associated with the current status in the local blockchain.

4. The method of claim 1, further comprising:
determining whether the local blockchain exists for the current status of the user activity;
if so, retrieving transaction data from the local blockchain and modifying an environment associated with the current status; and
storing the current status of the user activity and the modified environment in the local blockchain.

5. The method of claim 1, further comprising:
determining the current status of the user activity requires updates to the session blockchain based on an event type associated with the current user activity; and
storing the current status of the user activity in the session blockchain.

6. The method of claim 1, further comprising:
identifying that the current status of the user activity comprises an instance of private messaging.

7. The method of claim 6, further comprising:
creating a private messaging session; and
storing the current status of the user activity in the private message session.

8. An apparatus, comprising:
a memory storing one or more instructions; and
a processor that executes the one or more instructions to configure the processor to:
communicate, during an online game session, an update of a current status of a first user activity associated with at least one of a first user and a second user in the online game session to a local blockchain;
communicate, during an online game session, an update of a current status of a second user activity associated with at least one of the first user and the second user in the online game session to a session blockchain; and
validate the update to the session blockchain in response to the first user or the second user entering a new game session.

9. The apparatus of claim 8, wherein the game session comprises one or more of:
a chat session and an application sharing session.

10. The apparatus of claim 8, wherein the processor is further configured to:
determine whether the local blockchain exists for the current status of the user activity;
if not, create the local blockchain; and
store the current status of the user activity activities and an environment associated with the current user status in the local blockchain.

11. The apparatus of claim 8, wherein the processor is further configured to:
determine whether the local blockchain exists for the current status of the user activity;
if so, retrieve transaction data from the local blockchain and modify an environment associated with the current status; and
store the current status of the user activity and the modified environment in the local blockchain.

12. The apparatus of claim 8, wherein the processor is further configured to:

determine the current status of the user activity requires updates to the session blockchain based on an event type associated with the current user activity; and store the current status of the user activity in the session blockchain.

13. The apparatus of claim 8, wherein the processor is further configured to:

identify that the current status of the user activity comprises an instance of private messaging.

14. The apparatus of claim 13, wherein the processor is further configured to:

create a private messaging session; and store the current status of the user activity in the private message session.

15. A non-transitory computer readable storage medium storing one or more instructions that when executed by a processor causes the processor to perform:

communicating, during an online game session, an update of a current status of a first user activity associated with at least one of a first user and a second user in the online game session to a local blockchain;

communicating, during an online game session, an update of a current status of a second user activity associated with at least one of the first user and the second user in the online game session to a session blockchain; and validating the update to the session blockchain in response to the first user or the second user entering a new game session.

16. The non-transitory computer readable storage medium of claim 15, wherein the game session comprises one or more of:

a chat session and an application sharing session.

17. The non-transitory computer readable storage medium of claim 15, wherein the one or more instructions further cause the processor to perform:

determining whether the local blockchain exists for the current status of the user activity;

if not, creating the local blockchain; and storing the current status of the user activity and an environment associated with the current status in the local blockchain.

18. The non-transitory computer readable storage medium of claim 15, wherein the one or more instructions further cause the processor to perform:

determining whether the local blockchain exists for the current status of the user activity;

if so, retrieving transaction data from the local blockchain and modifying an environment associated with the current status; and storing the current status of the user activity and the modified environment in the local blockchain.

19. The non-transitory computer readable storage medium of claim 15, wherein the one or more instructions further cause the processor to perform:

determining the current status of the user activity requires updates to the session blockchain based on an event type associated with the current user activity; and storing the current status of the user activity in the session blockchain.

20. The non-transitory computer readable storage medium of claim 15, wherein the one or more instructions further cause the processor to perform:

identifying the current status of the user activity comprises an instance of private messaging;

creating a private messaging session; and storing the current status of the user activity in the private message session.

* * * * *